(12) United States Patent
Höfig

(10) Patent No.: US 10,796,315 B2
(45) Date of Patent: Oct. 6, 2020

(54) AUTOMATED RECERTIFICATION OF A SAFETY CRITICAL SYSTEM

(71) Applicant: Kai Höfig, Munich (DE)

(72) Inventor: Kai Höfig, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1527 days.

(21) Appl. No.: 14/586,818

(22) Filed: Dec. 30, 2014

(65) Prior Publication Data
US 2016/0171506 A1    Jun. 16, 2016

(30) Foreign Application Priority Data

Dec. 15, 2014  (EP) ...................................... 14198001

(51) Int. Cl.
*G06Q 30/00* (2012.01)
*G06Q 10/06* (2012.01)
*G06Q 50/26* (2012.01)

(52) U.S. Cl.
CPC ......... *G06Q 30/018* (2013.01); *G06Q 10/067* (2013.01); *G06Q 50/265* (2013.01)

(58) Field of Classification Search
None
See application file for complete search history.

(56) References Cited

U.S. PATENT DOCUMENTS

| | | | | |
|---|---|---|---|---|
| 4,870,575 A * | 9/1989 | Rutenberg | ............... | G06F 11/00 716/136 |
| 7,913,232 B2 * | 3/2011 | Erkkinen | ............... | G06Q 10/00 717/125 |
| 8,015,550 B2 * | 9/2011 | Berenbach | .......... | G06F 11/2257 714/25 |
| 8,457,996 B2 * | 6/2013 | Winkler | ................. | G06Q 10/00 705/348 |
| 8,831,926 B2 * | 9/2014 | Van der Velden | ... | G06Q 10/067 703/14 |
| 10,095,994 B2 * | 10/2018 | Winkler | ............... | G06Q 10/067 |
| 2002/0049625 A1 * | 4/2002 | Kilambi | ................. | G06F 17/50 706/62 |

(Continued)

OTHER PUBLICATIONS

Pilot Simha, "What Is a Fault Tree Analysis", Quality Progress, 3/02 found at http://asq.org/quality-progress/2002/03/problem-solving/what-is-a-fault-tree-analysis.html.*

(Continued)

*Primary Examiner* — Piotr Poltorak
(74) *Attorney, Agent, or Firm* — Lempia Summerfield Katz LLC

(57) ABSTRACT

A method for automated recertification of a safety critical system with at least one altered functionality is provided. The method includes providing a failure propagation model of the safety critical system. The method also includes updating the failure propagation model of the safety critical system according to the at least one altered functionality using inner port dependency traces between inports and outports of a failure propagation model element representing the at least one altered functionality. The method includes calculating top events of the updated failure propagation model, and comparing the calculated top events with predetermined system requirements to recertify the safety critical system.

9 Claims, 5 Drawing Sheets

(56) References Cited

U.S. PATENT DOCUMENTS

| | | | | |
|---|---|---|---|---|
| 2002/0193920 A1* | 12/2002 | Miller | G05B 23/0245 | 701/32.9 |
| 2003/0028823 A1* | 2/2003 | Kallela | G05B 23/0248 | 714/26 |
| 2003/0070108 A1* | 4/2003 | Groen | G06F 11/008 | 714/1 |
| 2004/0011325 A1* | 1/2004 | Benson | F02D 41/2496 | 123/299 |
| 2005/0015217 A1* | 1/2005 | Weidl | G05B 23/0281 | 702/185 |
| 2005/0036162 A1* | 2/2005 | Edge | H04N 1/6011 | 358/1.9 |
| 2005/0043922 A1* | 2/2005 | Weidl | G06N 5/04 | 702/183 |
| 2005/0049988 A1* | 3/2005 | Dahlquist | G05B 23/0278 | 706/46 |
| 2005/0281456 A1* | 12/2005 | Garvey | G01N 25/72 | 382/159 |
| 2006/0072265 A1* | 4/2006 | Bucella | H02J 13/0096 | 361/90 |
| 2006/0072480 A1* | 4/2006 | Deval | H04L 1/22 | 370/254 |
| 2006/0085108 A1* | 4/2006 | Grier | G05B 23/0248 | 701/29.1 |
| 2006/0241931 A1* | 10/2006 | Abu el Ata | G06Q 10/00 | 703/27 |
| 2007/0050178 A1* | 3/2007 | Linzey | G06Q 10/04 | 703/2 |
| 2008/0255682 A1* | 10/2008 | Zhao | G05B 19/4184 | 700/30 |
| 2009/0083734 A1* | 3/2009 | Hotra | G06F 21/51 | 718/1 |
| 2009/0113247 A1* | 4/2009 | Gofuku | G05B 17/02 | 714/37 |
| 2010/0100251 A1* | 4/2010 | Chao | G21D 3/001 | 700/292 |
| 2010/0179918 A1* | 7/2010 | Meunier | G16H 50/50 | 705/348 |
| 2010/0317420 A1* | 12/2010 | Hoffberg | G07F 17/323 | 463/1 |
| 2012/0317058 A1* | 12/2012 | Abhulimen | G06N 20/00 | 706/2 |
| 2013/0166135 A1* | 6/2013 | Dunsdon | B64F 5/40 | 701/29.3 |
| 2013/0301073 A1* | 11/2013 | Niimura | G06F 21/34 | 358/1.14 |
| 2013/0337867 A1* | 12/2013 | Brennan | H04W 24/02 | 455/558 |
| 2015/0088476 A1* | 3/2015 | Guo | G06F 17/5009 | 703/6 |
| 2015/0142402 A1* | 5/2015 | Ramesh | G06F 30/20 | 703/7 |
| 2017/0023935 A1* | 1/2017 | Armbruster | G05B 23/0248 | |
| 2017/0185971 A1* | 6/2017 | Masuko | G06Q 10/06311 | |

OTHER PUBLICATIONS

Jamboti et al., "Modeling and Analysis of State/Event Fault Trees using ESSaRel", DEPEND 2013: The Sixth International Conference on Dependability, ISBN: 978-1-61208-301-8, 2013.*

Skrobanek et al., "Analysis of Timing Requirements for Intrusion Detection and Prevention using Fault Tree with Time Dependencies", Mar. 22, 2011, DOI: 10.5772/15609.*

Lo et al, "Reliability and Sensitivity Analysis of Embedded Systems with Modular Dynamic Fault Trees", DOI: 10.1109/TENCON.2005. 300968, TENCON 2005-2005 IEEE Region 10 Conference, Dec. '05.*

Paul Mason, "On Traceability for Safety Critical Systems Engineering", Proceedings of the 12th Asia-Pacific Software Engineering Conference (APSEC'05), 0-7695-2465-6/05, 2005.*

Liggesmeyer et al., "Automatic Reliability Analysis of Electronic Designs using Fault Trees", in 13. Workshop Testmethoden und Zuverlässigkeit von Schaltungen und Systemen, 2001.*

Karanki et al., "Dynamic Fault Tree analysis using Monte Carlo simulation in probabilistic safety assessment", Article in Reliability Engineering [?] System Safety, DOI: 10.1016/j.ress.2008.09.007, Apr. 2009.*

Helmer et al., A Software Fault Tree Approach to Requiments Analysis of an Intrusion Detection System, Iowa State University & Jet Propulsion Laboratory, Oct. 2000.*

Steele et al., "Analysis of Critical System Certification", 2014 IEEE 15th International Symposium on High-Assurance Systems Engineering, 978-1-4799-3466-9/14 (Year: 2014).*

Ebbah, "Deploying Artificial Intelligence Techniques in Software Engineering", American Journal of Undergraduate Research vol. 1 No. 1, (Year: 2002).*

Mason, "On Traceability for Safety Critical Systems Engineering", APSEC '05: Proceedings of the 12th Asia-Pacific Software Engineering Conference, ISBN: 978-0-7695-2465-8 (Year: 2005).*

Kaiser B. et al: "A New Component Concept for Fault Trees," SCS, 03: Proceedings of the 8th Australian workshop on safety critical systems and software, pp. 37-46, 2003.

Papadopoulos Y. et al: "Hierarchically Performed Hazard Origin and Propagation Studies," Computer Safety, Reliability and Security, 1999.

* cited by examiner

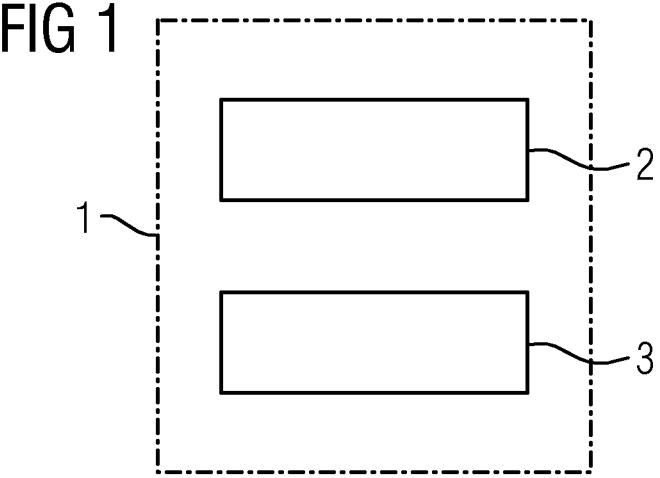
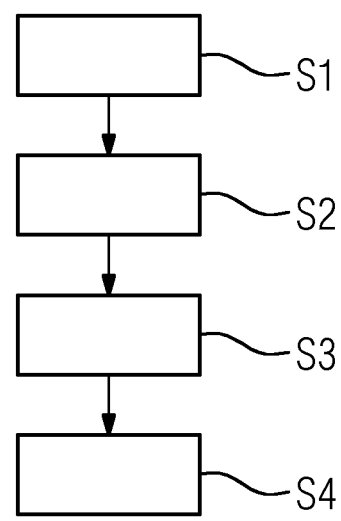

AUTOMATED RECERTIFICATION OF A SAFETY CRITICAL SYSTEM

This application claims the benefit of EP 14198001.1, filed on Dec. 15, 2014, which is hereby incorporated by reference in its entirety.

FIELD

The present embodiments relate to automated recertification of a safety critical system with at least one altered functionality.

BACKGROUND

A safety critical system is a system where failure or malfunction may result in damages of the equipment or where failure or malfunction may result in injuring people. Design methods for designing a safety critical system include probabilistic risk assessment, failure mode and effect analysis including fault tree analysis. Fault tree analysis offers the decomposition of the system into modules. Fault tree analysis is a deductive procedure used to determine various combinations of hardware and software failures as well as human errors that may cause undesired events referred to as top events at the system level. Complex technical systems may include a plurality of hardware and/or software components. An area where the development of safety analysis models is provided is safety critical cyberphysical systems. These cyberphysical systems include loosely coupled embedded systems. The alignment of the embedded systems is unclear at design time, and possible configurations at design time are almost infinite. Each embedded system forming part of a cyberphysical system may be reused in many different configurations. For such complex systems, a safety critical function may be certified automatically at runtime to assure a safe operation.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and an apparatus that allow automated recertification of a safety critical system (e.g., a safety critical cyberphysical system with altered functionality at runtime) are provided.

According to a first aspect, a method for automated recertification of a safety critical system with at least one altered functionality includes providing a failure propagation model of the safety critical system. The method also includes updating the failure propagation model of the safety critical system according to the altered functionality using inner port dependency traces between inports and outports of a failure propagation model element representing the altered functionality, calculating top events of the updated failure propagation model, and comparing the calculated top events with predetermined system requirements to recertify the safety critical system.

In one embodiment of the method according to the first aspect, the failure propagation model of the safety critical system includes a component fault tree model having component fault tree elements related to corresponding components of the safety critical system.

In a further embodiment of the method according to the first aspect, the component fault tree element includes output failure modes related to outports of the component fault tree element and input failure modes related to inports of the component fault tree element.

In another embodiment of the method according to the first aspect, the failure propagation model element representing the altered functionality is inserted into the failure propagation model of the safety critical system.

In a further embodiment of the method according to the first aspect, each inner port dependency trace indicates a possible dependency between the respective inport and outport of the failure propagation model element representing the altered functionality of the safety critical system.

In a further embodiment of the method according to the first aspect, the safety critical system with at least one altered functionality includes additional system components and/or replaced system components represented by corresponding failure propagation model elements.

In a further embodiment of the method according to the first aspect, if the calculated top events match with the predetermined system requirements, the safety critical system with the altered functionality is successfully recertified and implemented.

One or more of the present embodiments provide, according to the second aspect, a recertification apparatus for automatic recertification of a safety critical system with altered functionality. The apparatus includes a database storing a failure propagation model of the safety critical system. The apparatus also includes a calculation unit (e.g., a processor) configured to update the stored failure propagation model with at least one failure propagation model element representing the altered functionality of the safety critical system and including inner port dependency traces between inports and outports of the failure propagation model element. The calculation unit is further configured to compare calculated top events of the updated failure propagation model with predetermined system requirements to certify or recertify the safety critical system.

In one embodiment of the recertification apparatus according to the second aspect, the failure propagation model of the safety critical system includes a component fault tree model having component fault tree elements related to corresponding components of the safety critical system.

In an embodiment of the recertification apparatus according to the second aspect, the component fault tree element includes output failure modes related to outports of the component fault tree element and input failure modes related to inports of the component fault tree element.

In yet another embodiment of the recertification apparatus according to the second aspect, the calculation unit is configured to insert the failure propagation model element representing the altered functionality into the failure propagation model of the safety critical system.

In a further embodiment of the recertification apparatus according to the second aspect, each inner port dependency trace between an inport and an outport of the failure propagation model element representing the altered functionality indicates a possible dependency between the respective inport and outport of the failure propagation model element.

In a further embodiment of the recertification apparatus according to the second aspect, if the calculated top events match with the predetermined system requirements, the safety critical system with altered functionality is successfully certified or recertified by the calculation unit and implemented.

One or more of the present embodiments provide, according to the third aspect, a safety critical system implemented after the recertification apparatus according to the second aspect has certified or recertified the safety critical system.

In an embodiment of the safety critical system according to the third aspect, the safety critical system with altered functionality includes additional and/or replaced hardware or software components.

BRIEF DESCRIPTION OF THE FIGURES

FIG. 1 shows a block diagram of an embodiment of a recertification apparatus;

FIG. 2 shows a flowchart of an embodiment of a method for automated recertification of a safety critical system;

DETAILED DESCRIPTION

Figure 7:
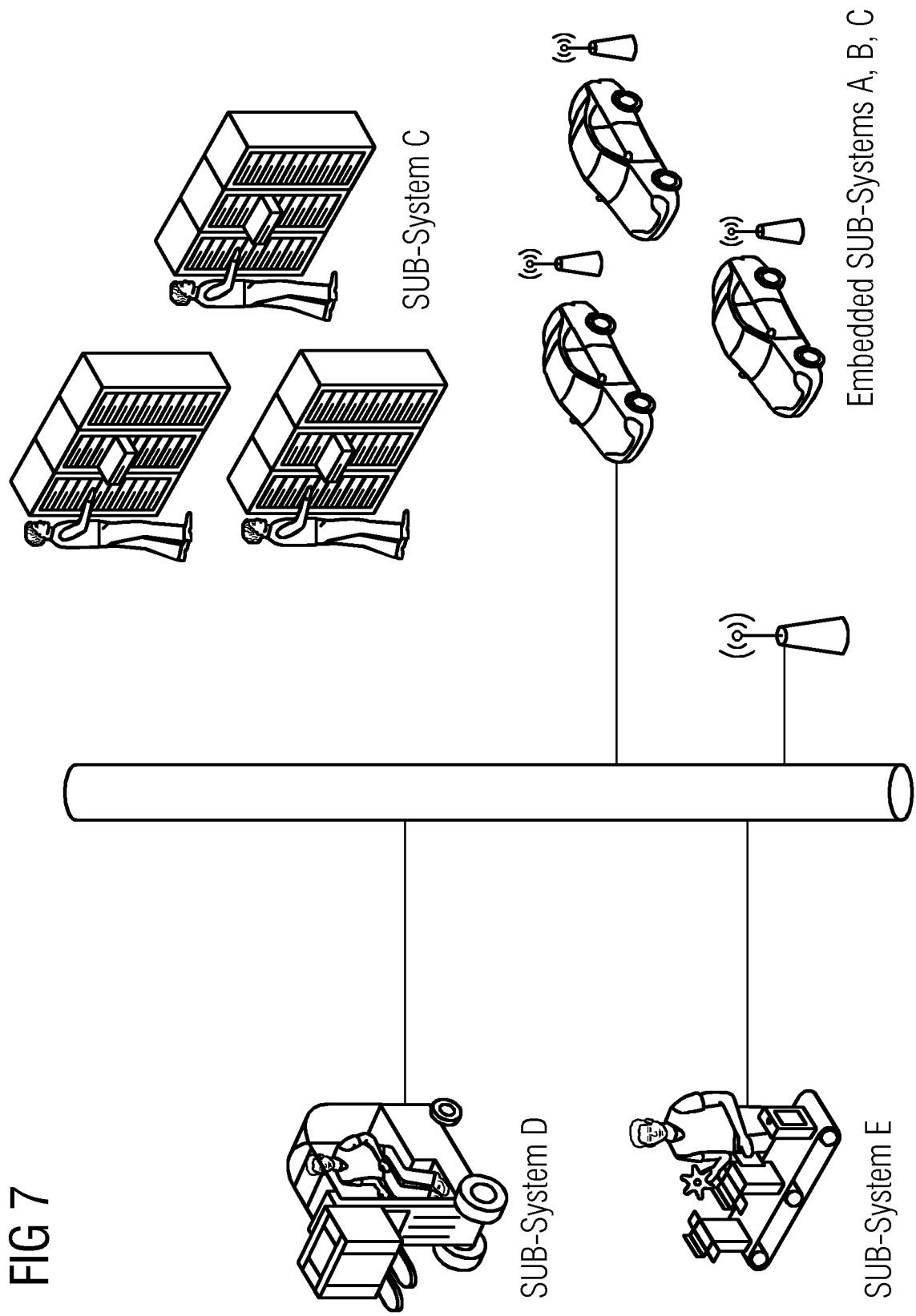
FIG. 7 shows an exemplary cyberphysical system illustrating a use case for the method and apparatus.

FIG. 1 shows a block diagram of an exemplary embodiment of a recertification apparatus 1 for automated recertification of a safety critical system with altered functionality. The recertification apparatus 1 includes a database 2 storing a failure propagation model of the safety critical system to be certified or to be recertified. The safety critical system may be, for example, a safety critical cyberphysical system. An example of a cyberphysical system is illustrated in FIG. 7. All participants or subsystems of the cyberphysical system may interact with each other via a wired or wireless connection. If one of the subsystems wants to fulfill a safety critical function, the one subsystem may require some input or input data from another participant or subsystem. For example, if subsystem B provides autonomous driving, the subsystem B may require input data from a mainframe computer providing street data. For using the received data, subsystem B may verify the quality of the received data of the other subsystem. If the data source may not provide a complete safety analysis model, subsystem B of the cyberphysical system may not guarantee a safe function. If the source system provides a safety analysis model, the safety analysis model may be used to complete an existing safety analysis model that is stored within the database. For example, with a complete analysis model, subsystem D may provide information about quality of the subsystem D to another subsystem such as subsystem B. Subsystem B may then decide whether to use the data for a safety critical function or whether the received quality of the data is too low. Further, subsystem B may use the electronically transferred information or data received from subsystem D as input for an electronically stored safety analysis model of the subsystem B. If subsystem B does not have sufficient computational power, the decision may be shifted to a remote computer that calculates a safety analysis and provides a decision whether to interact with subsystem D or with another subsystem. The cyberphysical system illustrated in FIG. 7 includes coupled embedded systems. The alignment of the embedded subsystems may be unclear at design time, and the number of possible configurations at design time may be very high. Each embedded subsystem of the safety critical cyberphysical system may be reused in many different configurations. For such a safety critical system, the provided safety critical function of the complex safety critical system may be recertified automatically at runtime to provide a safe operation of the safety critical system.

The recertification apparatus 1 according to one or more of the present embodiments, as illustrated in FIG. 1, stores a failure propagation model of the safety critical system in database 2 of the recertification apparatus 1. The recertification apparatus 1 also includes a calculation unit 3 (e.g., computer) configured to update the stored failure propagation model with a failure propagation model element representing the altered functionality of the safety critical system and including inner port dependency traces between inports and outports of the failure propagation model element. The calculation unit 3 also compares calculated top events of the updated failure propagation model with predetermined system requirements to recertify the respective safety critical system. In a possible embodiment, the failure propagation model of the safety critical system stored in the database 2 includes a component fault tree, CET, model having component fault tree elements related to corresponding components of the safety critical system. Each component fault tree element related to corresponding components of the safety critical system may include output failure modes related to outports of the component fault tree element and input failure modes related to inports of the component fault tree element.

Safety critical systems such as a cyberphysical safety critical system, as illustrated in FIG. 7, may be recertified by the recertification apparatus 1, as illustrated in FIG. 1, with at least one altered functionality. This altered functionality may include additional system components and/or replaced system components represented by corresponding failure propagation model elements. The system components may include hardware components or software components of the safety critical system.

For example, in a vehicle including a plurality of hardware and software components, a hardware component may be added to the complex system or replaced by another component. Further, software components of the complex system may be added, or existing software components may be updated to provide additional or altered functionality. In one embodiment, the calculation unit 3 is configured to insert automatically a failure propagation element representing the altered functionality into the stored failure propagation model of the safety critical system. Each inner port dependency trace between an inport and an outport of the inserted failure propagation model element representing the altered functionality indicates a possible dependency between the respective inport and outport of the failure propagation model element. If the calculated top events match with predetermined system requirements, the safety critical system with altered functionality is successfully recertified by the recertification apparatus 1 and may be implemented or further developed. In one embodiment, the certification or recertification of the safety critical system is performed automatically at runtime of the safety critical system to provide a safe and continuous operation of the safety critical system.

FIG. 2 shows a flowchart of an embodiment of a method for automated recertification of a safety critical system with at least one altered functionality.

In act S1, a failure propagation model of the safety critical system is provided. The failure propagation model of the safety critical system may be stored in a database or a memory such as the database 2 of the recertification apparatus 1 illustrated in FIG. 1, for example.

In act S2, the failure propagation model of the safety critical system is updated according to the altered functionality using inner port dependency traces between inports and outports of a failure propagation model element representing the altered functionality.

In act S3, top events of the updated failure propagation model are calculated.

In act S4, the calculated top events are compared with predetermined system requirements to recertify the safety critical system. The successfully recertified safety critical system may be implemented. The failure propagation model of the safety critical system used by the method shown in FIG. 2 may include a component fault tree model having component fault tree elements related to corresponding components (e.g., hardware and/or software components of the safety critical system). These component fault tree elements may include output failure modes related to outports of the component fault tree element and input failure modes related to inports of the component fault tree element. In one embodiment of the method, as illustrated in FIG. 2, a failure propagation model element representing the altered functionality may be inserted into the failure propagation model of the safety critical system. Each inner port dependency trace indicates a possible dependency between the respective inport and outport of the failure propagation model element representing the altered functionality of the safety critical system. The safety critical system with the at least one altered functionality may include additional system components and/or replace system components represented by corresponding failure propagation model elements. Only if the calculated top events match with the predetermined system requirements, the safety critical system with the altered functionality is successfully recertified and may be implemented. During the early stages of the development of a safety critical system, rapid development and analysis of safety analysis models is important. These safety analysis models may identify drawbacks or insufficiencies of the investigated system in terms of safety. An early identification of such drawbacks may be necessary for an efficient development process of the safety critical system. In industrial applications, existing artifacts such as hardware and/or software components are reused for the development of updated systems. Changes are made to these existing artifacts to match the system requirements for the safety critical system to be developed. When development artifacts are reused, the existing stored safety analysis models may form relevant input for an early safety assessment of the new safety critical system, since the existing stored safety analysis models already provide a valid data model. However, changes and adoptions during the new development may invalidate former analyses and require an adoption to the performed changes.

For fault tree analysis, fault tree elements are related to development artifacts and may be reused along with the reused development artifact. Modular or compositional safety analysis methodologies such as component fault trees as specified in Bernhard Kaiser, Peter Liggesmeyer and Oliver Mäckel: "A new component concept for fault trees" in SCS, 03: Proceedings of the 8th Australian workshop on safety critical systems and software, pages 37-46, Darlinghurst, Australia, 2003, Australian Computer Society, Inc., or HipHops, as described by Yiannis Papadopoulos and John A. McDermid: "Hierarchically Performed Hazard Origin and Propagation Studies" in Computer Safety, Reliability and Security, 1999, may be used to ease adoption of changes for existing development artifacts by constraining the adoption activities for safety to the artifacts that require changes and provide benefits for an automated proof of the safety critical system.

The method and apparatus according to one or more of the present embodiments provide automation to fill empty safety analysis artifacts. Components or artifacts that are developed from scratch or a new safety critical system to be developed and which did not exist in any former safety critical system require the development of safety analysis models to be integrated in the existing failure propagation model of the safety critical system for a system-wide analysis at early stages of the development or planning of the new safety critical system.

With the method and apparatus according to one or more of the present embodiments, empty safety analysis artifacts are automatically filled up to enable a fuzzy but rapid analysis of the entire safety critical system at a very early development stage if safety analysis models exist at least for some development artifacts. The method and apparatus according to one or more of the present embodiments also allow an automated certification at runtime of the safety critical system. The method and apparatus according to one or more of the present embodiments use inner port relations to fill up safety analysis models on component fault trees of components that do not include a safety analysis model.

Ports are interfaces that allow joining subcomponents of a system together. To preserve the direction of gates, two types of ports may be distinguished (e.g., inports and outports). In a component fault tree, CFT, each component may be stored independently of each other so that the different components of the system may be developed by different people. Further, each component of the system is modeled only once and may be reused as often as needed. Component fault trees may be described by a set of Boolean functions, with each one belonging to one output port. Each function maps the input port and the internal events of the respective component to a Boolean term assigned to an output port. Inports and outports of a single component are related to each other. The developer may relate an outport to an inport of a component if the output of the outport is dependent on the input from the inport.

Figure 3:
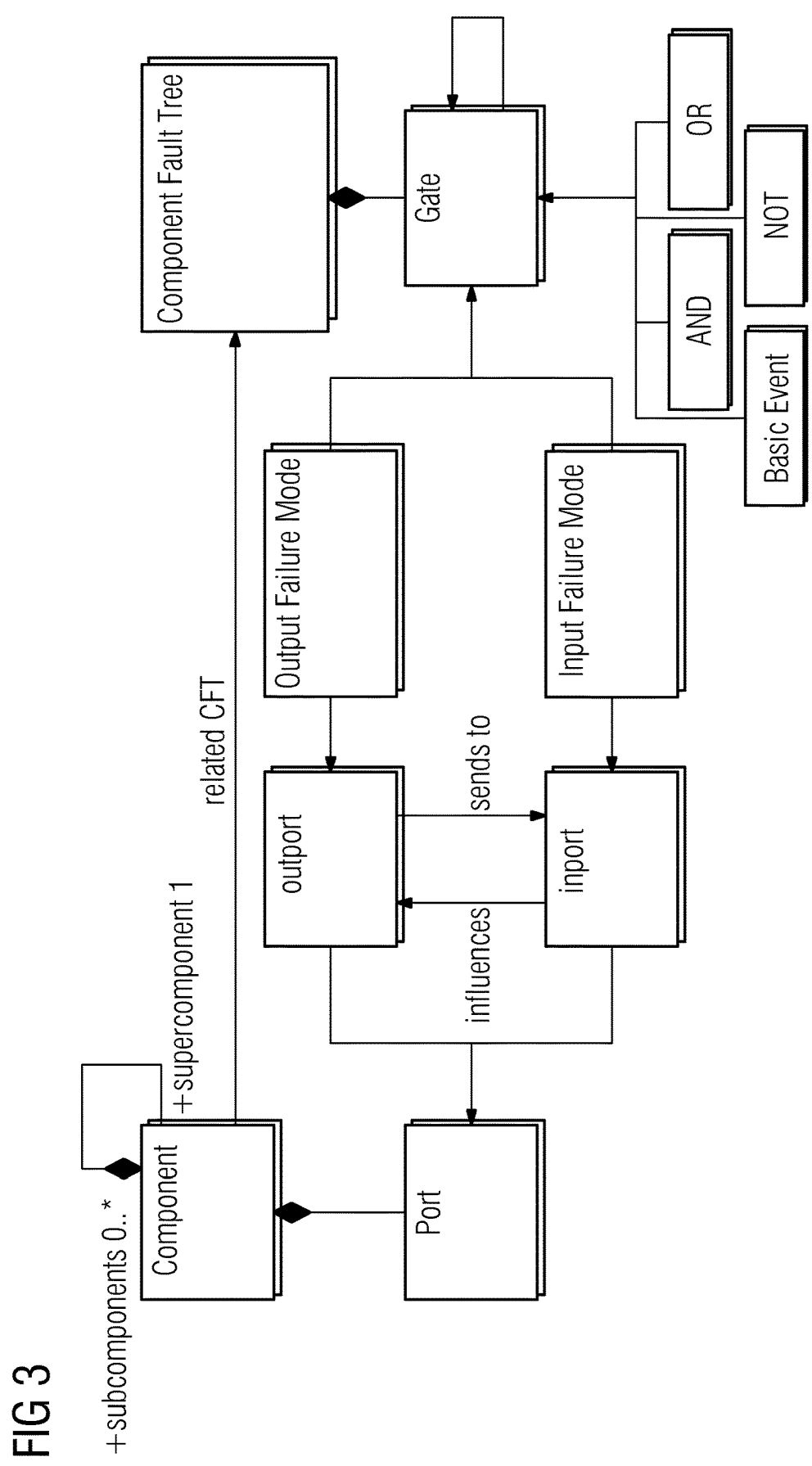
FIG. 3 shows a diagram illustrating a meta model useable by the method and apparatus.

FIG. 3 illustrates required model elements related to each other in a meta model. The components build a hierarchy using sub- and supercomponents that are contained in each other. Each component of the system may have an arbitrary number of inports and outports. Each component may include a related component fault tree, CFT, element containing information how failures propagate from inports to outports using Boolean functions with additional basic events and Boolean gates such as OR and AND. The influence relationship illustrated in the meta model of FIG. 3 may be used to model a dependency of an outport from an inport within the respective system component (e.g., an inner port dependency trace). The sends-relationship in the meta model of FIG. 3 is used to model a flow of information from an outport of a component to an inport of a different component of the system.

A component fault tree is a Boolean model associated to system development elements such as components including hardware and/or software components of the safety critical system. Similar to conventional fault trees, a component fault tree may be used to model a failure behavior of a safety critical system. This failure behavior is used to document that a system is safe and may also be used to identify drawbacks of the design of the respective safety critical system.

As illustrated in the meta model of FIG. 3, a separate component fault tree element is related to a component of the system. Failures that are visible at the outport of a component are models using output failure modes that are related to the specific outport. Further, to model how specific failures propagate from an inport of a component to the outport of the component, input failure modes are used, as illustrated in FIG. 3. The inner failure behavior of a component that also influences the output failure modes is modeled using gates including gates NOT, AND, OR, as well as basic events, as illustrated in the meta model of FIG. 3.

Each component fault tree may be transformed to a classic fault tree by removing the input failure mode elements and the output failure mode elements.

Figure 4:
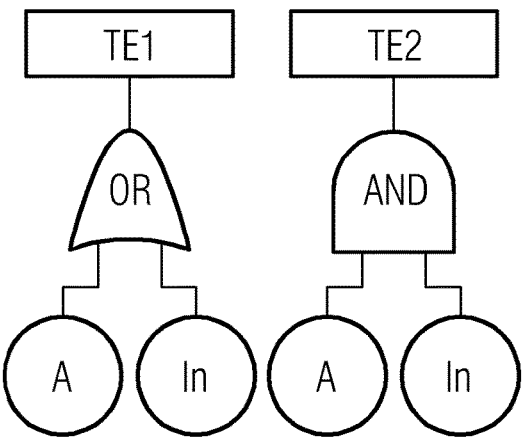
FIGS. 4, 5 show diagrams illustrating a conventional fault tree and a component fault tree as used by the method and apparatus.
Figure 5:
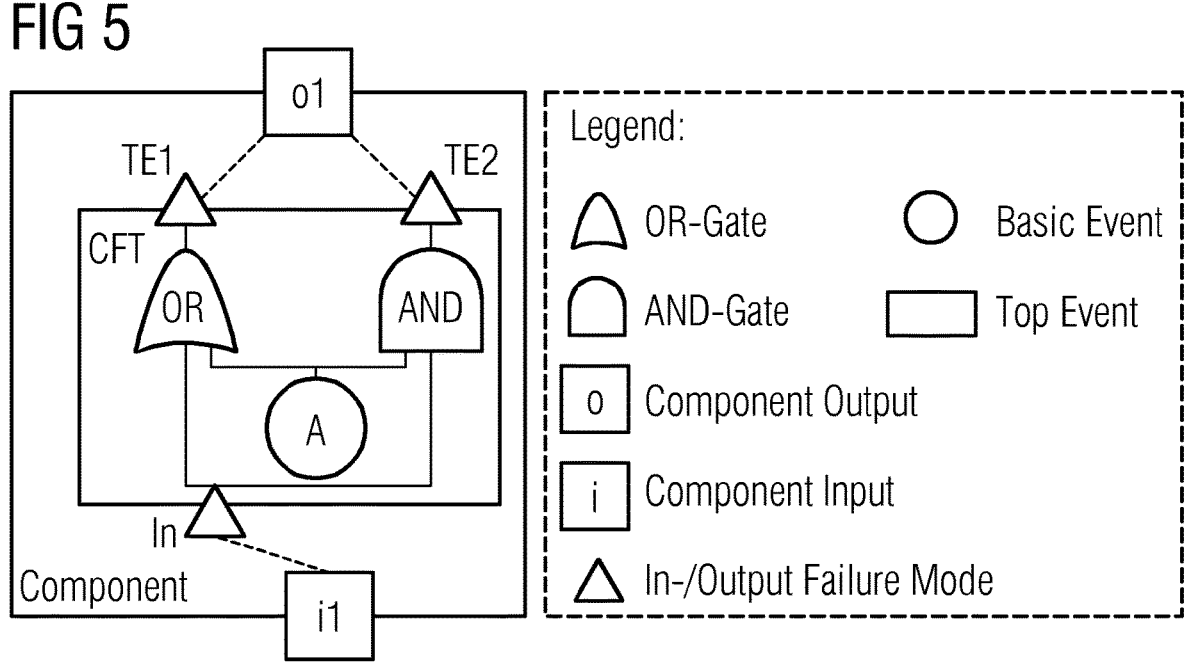

FIG. 4 illustrates a conventional classic fault tree, whereas FIG. 5 illustrates a component fault tree. In both trees, the top events, TE, or output events TE1 and TE2 are modeled. The component fault tree, CFT, model of FIG. 5 allows, additionally to the Boolean formulae that are also modeled within the classic fault tree of FIG. 4, to associate the specific top events to the corresponding ports where these failures may appear. Top event TE1, for example, appears at port O1. Using this methodology of components also within fault tree models provides benefits during the development process (e.g., an increased maintainability of the respective safety analysis model).

With the method and apparatus according to one or more of the present embodiments, inner port dependency traces are used to automatically generate missing safety analysis model elements or component fault trees.

Figure 6:
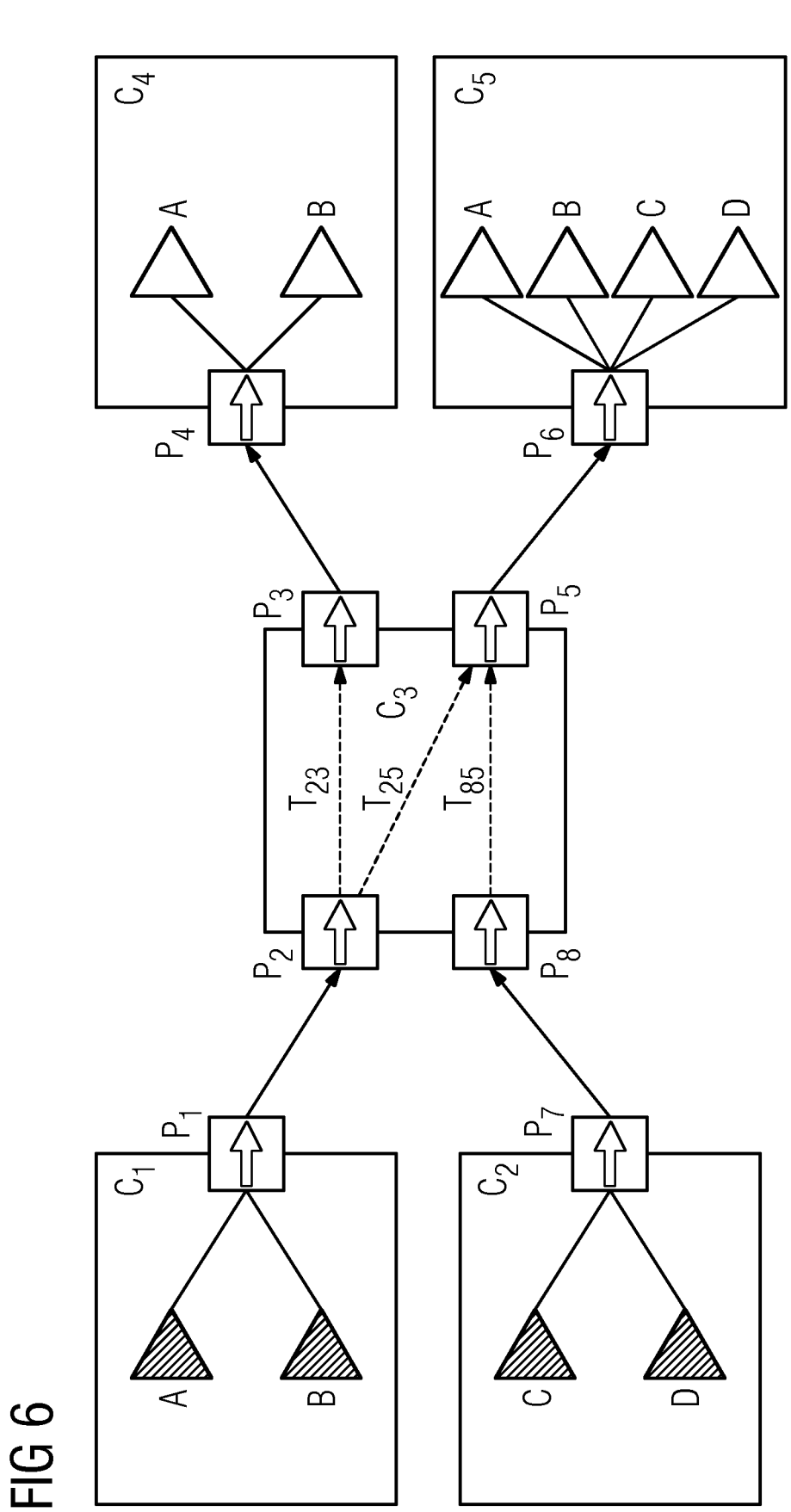
FIG. 6 shows a diagram illustrating an exemplary model using inner port dependency relationships for automated failure propagation to illustrate the operation of the method and apparatus.

FIG. 6 shows a schematic diagram of an exemplary model of a safety critical system using inner port dependency relationships for automated failure propagation.

With $C = c_1, \ldots, c_n$ being the set of components of a system, $CFT = cft_1, \ldots, cft_m \cup \phi$ is the set of component fault trees with $\tilde{CFT}(c) = cft$ with $c \in C$ and $cft \in CFT$ with $IN(c) = in_1, \ldots, in_i$, and $OUT(c) = out_1, \ldots, out_j$ being the in- and outports of a component c.

$\overline{CON} = \{(out, in) | out \in OUT(c_1) \cup \ldots OUT(c_n), in \in IN(c_1) \cup \ldots \cup IN(c_n)\}$ is the set of all possible port connections, and $CON \subseteq \overline{CON}$ is the set of actual port connections modeling the data flow from the outport of a component to the inport of another component.

$\overline{TRACE}(c) = \{(in, out) | in \in IN(c), out \in OUT(c)\}$ is the set of all possible inner port dependency traces of a component c, with $TRACE(c) \subseteq \overline{TRACE}(c)$ forming the actual inner port dependencies of the component c. For the exemplary system illustrated in FIG. 6, the previously defined sets are $C = c_1, c_2, c_3, c_4, c_5$ (1)

$IN(c_1) = IN(c_2) = \{\}$ (2)

$IN(c_3) = p_2, p_8$ (3)

$IN(c_4) = p_4$ (4)

$IN(c_5) = p_6$ (5)

$OUT(c_1) = p_1$ (6)

$OUT(c_2) = p_7$ (7)

$OUT(c_3) = p_3, p_5$ (8)

$OUT(c_4) = OUT(c_5) = \{\}$ (9)

$CONN = (p_1, p_2), (p_3, p_4), (p_7, p_8), (p_5, p_6)$ (10)

$TRACE(c_1) = TRACE(c_2) = \{\}$ (11)

$TRACE(c_4) = TRACE(c_5) = \{\}$ (12)

$TRACE(c_3) = (p_2, p_3), (p_2, p_5), (p_8, p_5).$ (13)

If component c includes a component fault tree, then $\tilde{CFT}(c) = cft, cft \neq \phi.$ If component c has input and output failure modes, then $IFM(in) \neq \{\}$ and $OFM(out) \neq \{\}$ for an import $in \in IN(c)$ and an outport $out \in OUT(c)$. In the example system, as depicted in FIG. 5, the input and output failure modes related to the ports are $OFM(p_1) = A, B$ (14)

$OFM(p_7) = C, D$ (15)

$OFM(p_3) = OFM(p_5) = \{\}$ (16)

$IFM(p_2) = IFM(p_8) = \{\}$ (17)

$IFM(p_4) = A, B$ (18)

$IFM(p_6) = A, B, C, D.$ (19)

For a component c that has no component fault tree, $\tilde{CFT}(c) = \phi.$

If all components c have component fault trees, CFT, and the model is used in a proper way, all input and output failure modes may be connected with each other by using the connections defined in CON. If one component has no component fault tree, it is unclear how the output failure modes that came from other components propagate through the component with no component fault tree. If a component c has no component fault tree, and one inport $in \in IN(c)$ receives information from the outport out' of another component c' with $\tilde{CFT}(c') = cft', cft' \neq \phi.$ and (out', in) $\in$ CON, a conventional system-wide fault tree analysis may not be performed; there is no component fault tree, CFT, that indicates how the output failure modes OFM (out') propagate to the outports OUT(c) of the respective component c. In the exemplary system shown in FIG. 6, such a component is $c_3$. The ports $p_2$ and $p_8$ provide no input failure modes (e.g., triangles) to connect the output failure modes A, B, C, D of the connected ports $p_1$ and $p_7$. Component $c_3$ does not provide any output failure modes at the ports $p_3$ and $p_5$, but the failure modes A, B, C, D are provided as input failure modes of the ports $p_4$ and $p_6$. The conventional model may not be used to automatically analyze the entire system because of a white spot at component $c_3$.

With the method according to one or more of the present embodiments, inner port dependency traces TRACE(c) of a component c that has no component fault tree are used. If there are outports of c that have an inner dependency trace with in, $$o_1, \ldots, o_k \subseteq \mathrm{OUT}(c) \text{ and } (\mathrm{in}, o_i) \in \mathrm{TRACE} \text{ for } i=1, \ldots, k.$$

The inner port dependency traces express that the output of the outports $o_1, \ldots, o_k$ depend on the input provided by the inport in. Vice versa, the other outputs of c, $o_1, \ldots, o_k \cap \mathrm{OUT}(c)$ are independent from the input provided by inport in. Without the information about the port dependencies, only a worst case scenario may be assumed for the failure propagation. The worst case assumption may be that if any failure mode is activated at one of the inports, all failure modes of all outports are active. With the inner port dependency, this worst case scenario may be isolated to the ports that depend on the port that has an active failure mode by propagating all provided output failure modes from OFM (out') of component c' to the dependent outports of c with $$\mathrm{OFM}(o_i) = \mathrm{OFM}(\mathrm{out}'), i=1, \ldots, k.$$

In the example system, as depicted in FIG. 6, the inner port dependency traces of component $c_3$ with $$\mathrm{TRACE}(c_3) = (p_2, p_3), (p_2, p_5), (p_8, p_5) \qquad (30)$$

may be used to complete the data model.

$$(p_2, p_3) \in \mathrm{TRACE}(c_3) \rightarrow \mathrm{OFM}(p_3) = A, B \qquad (20)$$

$$(p_2, p_5), (p_8, p_5) \in \mathrm{TRACE}(c_3) \rightarrow \mathrm{OFM}(p_5) = A, B, C, D. \qquad (21)$$

may be set.

Depending on the application or the context in the system, either all failure modes of the dependent outports $o_1, \ldots, o_k$ of a component c are active if one of the output failure modes OFM(out') is active, or only the failure mode that has the same type is active. For example, if a failure mode of OFM(out') models the situation that a signal is too late, the inner port dependency trace may be used to mark all dependent outputs as late if this failure mode is active. In some situations, however, the failure type may change in a component (e.g., a delayed signal may causes an erroneous output).

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for automated recertification of a safety critical system with at least one altered functionality, the method comprising:
    providing a failure propagation model of the safety critical system;
    updating, by a processor, the failure propagation model of the safety critical system according to an altered functionality of a component of the safety critical system using inner port dependency traces between inports and outports of a failure propagation model element representing the altered functionality of the component of the safety critical system;
    calculating, by the processor, top events of the updated failure propagation model; and
    comparing, by the processor, the calculated top events with predetermined system requirements of the safety critical system; and
    recertifying and implementing, when the calculated top events match with the predetermined system requirements, the safety critical system having the altered functionality,
    wherein the failure propagation model of the safety critical system comprises a component fault tree model having component fault tree elements related to corresponding components of the safety critical system, and
    wherein a component fault tree element of the component fault tree elements comprises output failure modes related to outports of the component fault tree element and input failure modes related to inports of the component fault tree element.

2. The method of claim 1, wherein the failure propagation model element representing the altered functionality is inserted into the failure propagation model of the safety critical system.

3. The method of claim 1, wherein each of the inner port dependency traces indicates a possible dependency between the respective inport and outport of the failure propagation model element representing the altered functionality of the safety critical system.

4. The method of claim 1, wherein the safety critical system with the at least one altered functionality comprises additional system components, replaced system components, or additional system components and replaced system components represented by corresponding failure propagation model elements.

5. A recertification apparatus for automatic recertification of a safety critical system with altered functionality, the apparatus comprising:
    a database stored in a memory and configured to store a failure propagation model of the safety critical system; and
    a processor configured to:
        update the stored failure propagation model with a failure propagation model element representing the altered functionality of a component of the safety critical system and comprising inner port dependency traces between inports and outports of the failure propagation model element representing the altered functionality of the component of the safety critical system; and
        compare calculated top events of the updated failure propagation model with predetermined system requirements of the safety critical system; and
    recertify and implement, when the calculated top events match with the predetermined system requirements, the safety critical system having the altered functionality, wherein the failure propagation model of the safety critical system comprises a component fault tree model having component fault tree elements related to corresponding components of the safety critical system, wherein a component fault tree element of the component fault tree elements comprises output failure modes related to outports of the component fault tree element and input failure modes related to inports of the component fault tree element.

6. The recertification apparatus of claim 5, wherein the processor is configured to insert the failure propagation model element representing the altered functionality into the failure propagation model of the safety critical system.

7. The recertification apparatus of claim 5, wherein each inner port dependency trace between inports and outports of the failure propagation model element representing the altered functionality indicates a possible dependency between the respective inport and outport of the failure propagation model element.

8. A safety critical system with altered functionality, wherein the safety critical system is implemented after a recertification apparatus has recertified the safety critical system, the recertification apparatus comprising:
 a database configured to store a failure propagation model of the safety critical system; and
 a processor configured to:
  update the stored failure propagation model with a failure propagation model element representing the altered functionality of a component of the safety critical system and comprising inner port dependency traces between inports and outports of the failure propagation model element representing the altered functionality of the component of the safety critical system; and
  compare calculated top events of the updated failure propagation model with predetermined system requirements of the safety critical system to recertify and implement, when the calculated top events match with the predetermined system requirements, the safety critical system having the altered functionality, wherein the failure propagation model of the safety critical system comprises a component fault tree model having component fault tree elements related to corresponding components of the safety critical system, wherein a component fault tree element of the component fault tree elements comprises output failure modes related to outports of the component fault tree element and input failure modes related to inports of the component fault tree element.

9. The safety critical system of claim 8, wherein the safety critical system with altered functionality comprises additional hardware, replaced hardware, or the additional hardware and the replaced hardware, or software components.

* * * * *